United States Patent [19]

Posso

[11] 4,296,890
[45] Oct. 27, 1981

[54] PROCESS FOR THE SIMPLIFIED PACKING OF A MAGNETIC TAPE FOR COMPUTER AND WINDING CORE FOR CARRYING OUT THIS PROCESS

[76] Inventor: Patrick Posso, 10, Avenue Jurigoz, Lausanne, Switzerland, CH-1006

[21] Appl. No.: 147,520

[22] Filed: May 7, 1980

[30] Foreign Application Priority Data

May 14, 1979 [FR] France ............................ 79 12221

[51] Int. Cl.³ ............................................. B65H 75/18
[52] U.S. Cl. ................................................... 242/71.8
[58] Field of Search .................. 242/71.8, 56.2, 118.4, 242/118.6, 118.7

[56] References Cited

U.S. PATENT DOCUMENTS

| | | | |
|---|---|---|---|
| 3,229,928 | 1/1966 | Burgess | 242/71.8 |
| 3,327,960 | 6/1967 | Hedin | 242/71.8 |
| 3,346,211 | 10/1967 | Gruber | 242/71.8 |
| 3,389,872 | 6/1968 | Lymon | 242/71.8 |
| 3,410,500 | 11/1968 | Elliott | 242/71.8 |
| 3,632,053 | 1/1972 | Edwards | 242/71.8 |
| 4,052,020 | 10/1977 | Knox | 242/71.8 |
| 4,083,509 | 4/1978 | Vasudeva | 242/71.8 |
| 4,088,278 | 5/1978 | Adair | 242/71.8 |

*Primary Examiner*—Edward J. McCarthy
*Attorney, Agent, or Firm*—James E. Nilles

[57] ABSTRACT

The present invention relates to a process for the simplified packing of a magnetic tape for computer and to a winding core for carrying out this process, wherein the core comprises a peripheral ring and a central hub connected by a web and fast with radial ribs, then a cover of stepped section also fast with radial ribs interposed between the preceding ones, the cover being welded by ultrasounds at certain spots in the inner cavity of the unit; side elements are added and fixed on the core when the latter is filled with magnetic tape. The invention is more particularly applicable to the packing of magnetic tape for computer during manufacture and use thereof.

6 Claims, 10 Drawing Figures

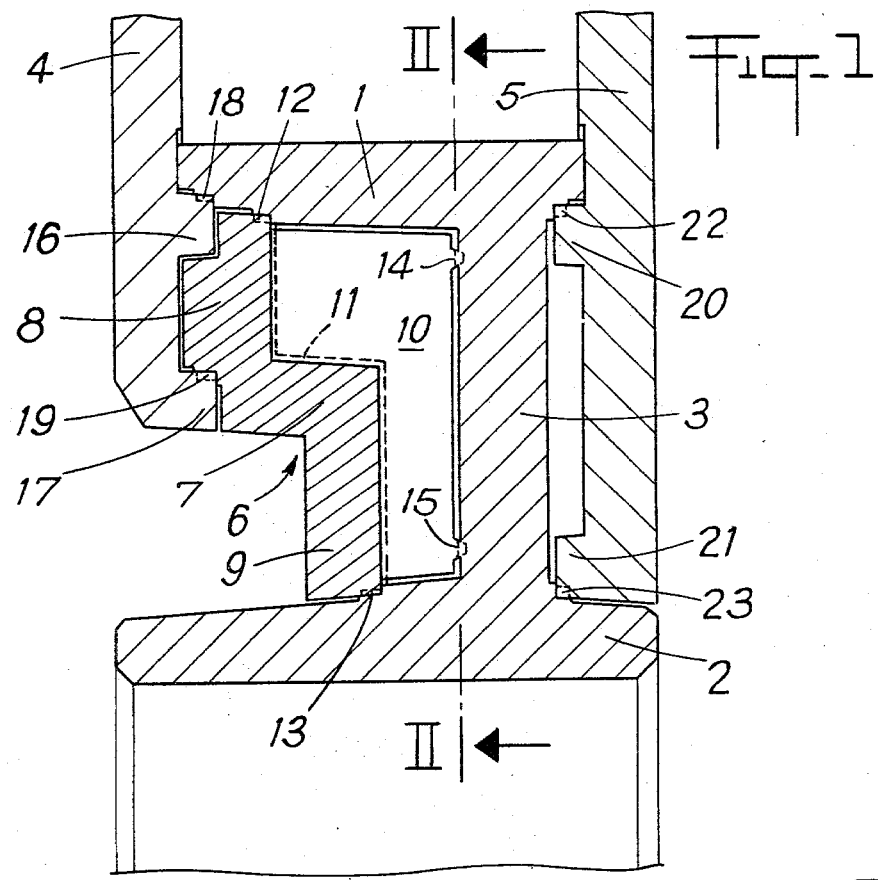
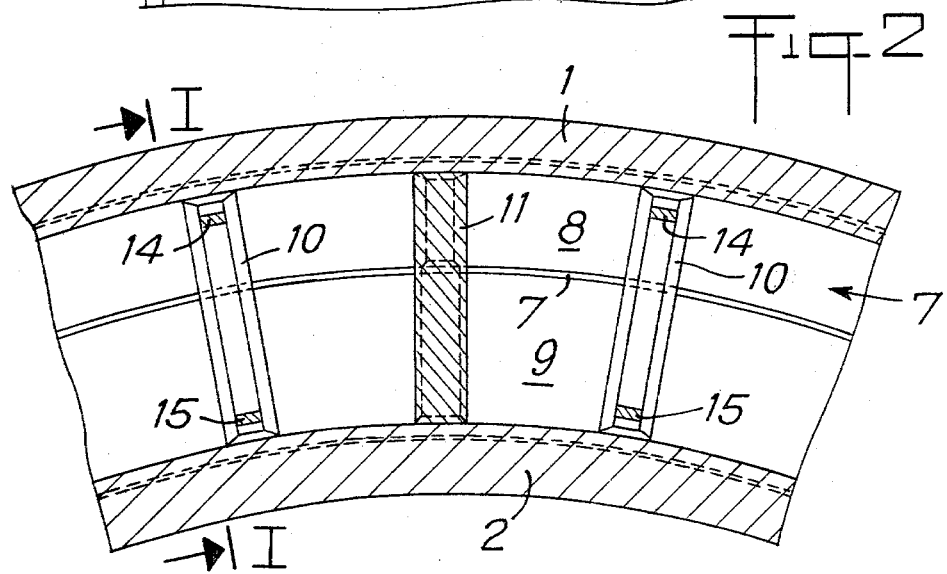

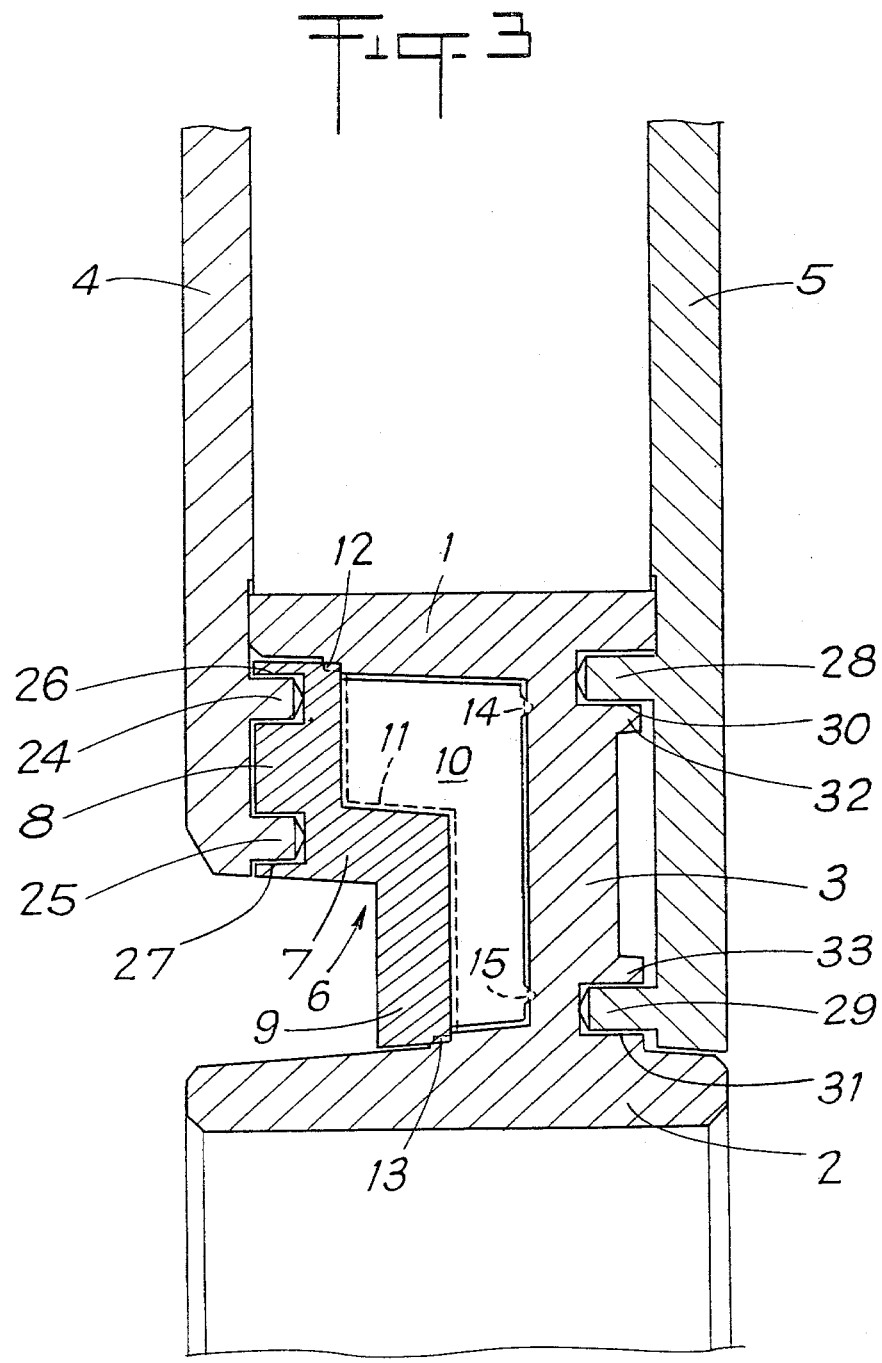

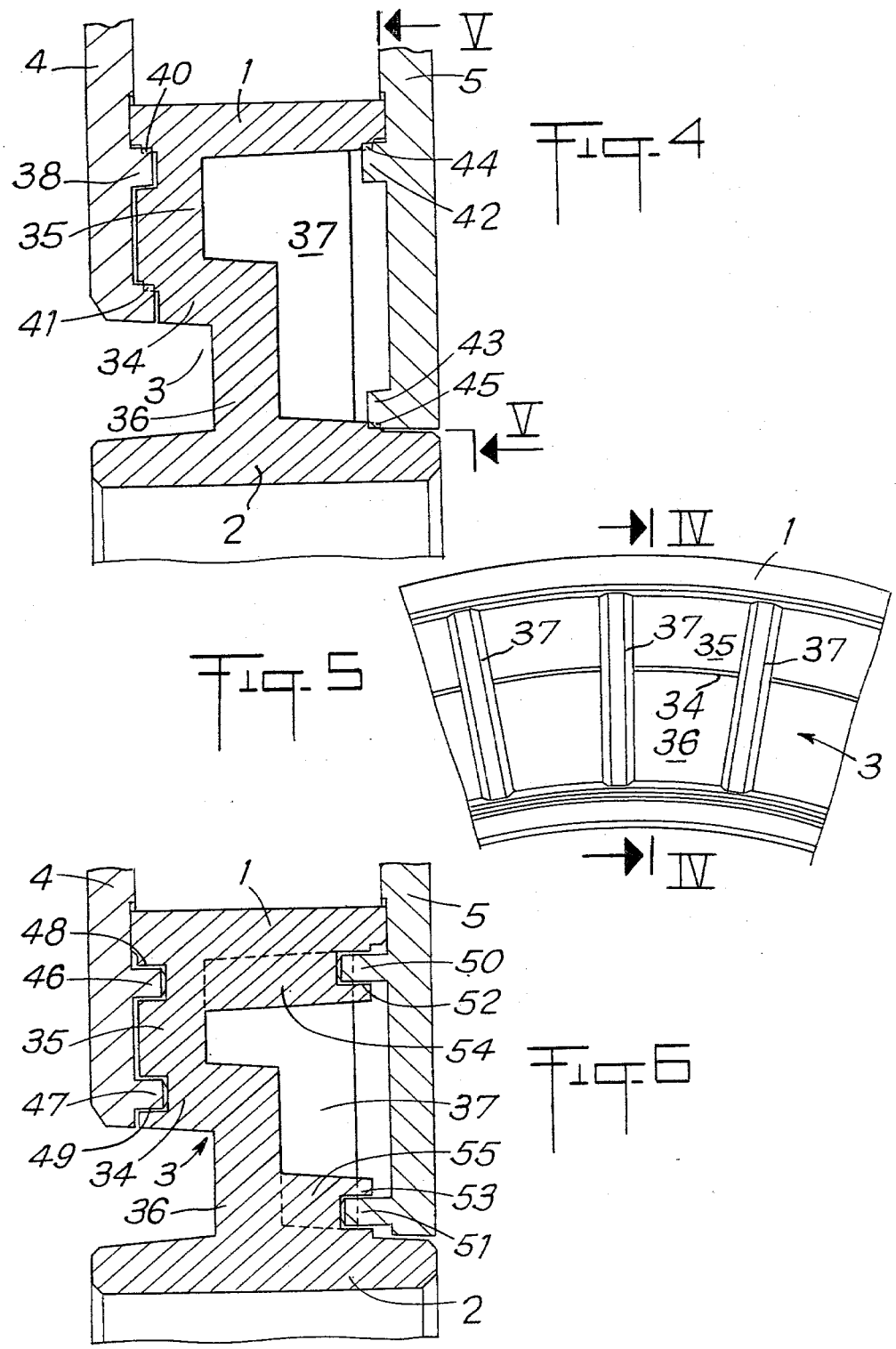

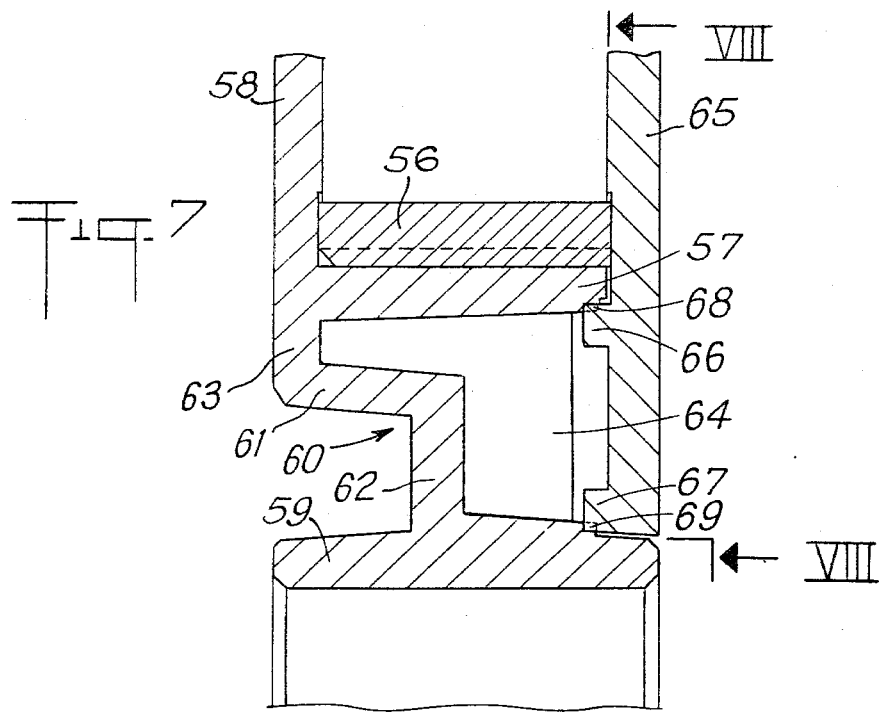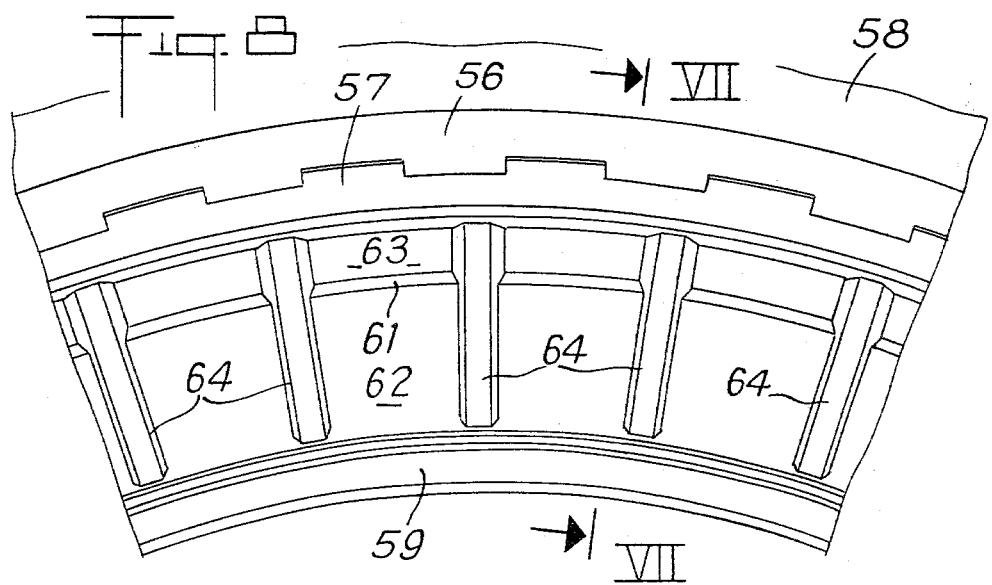

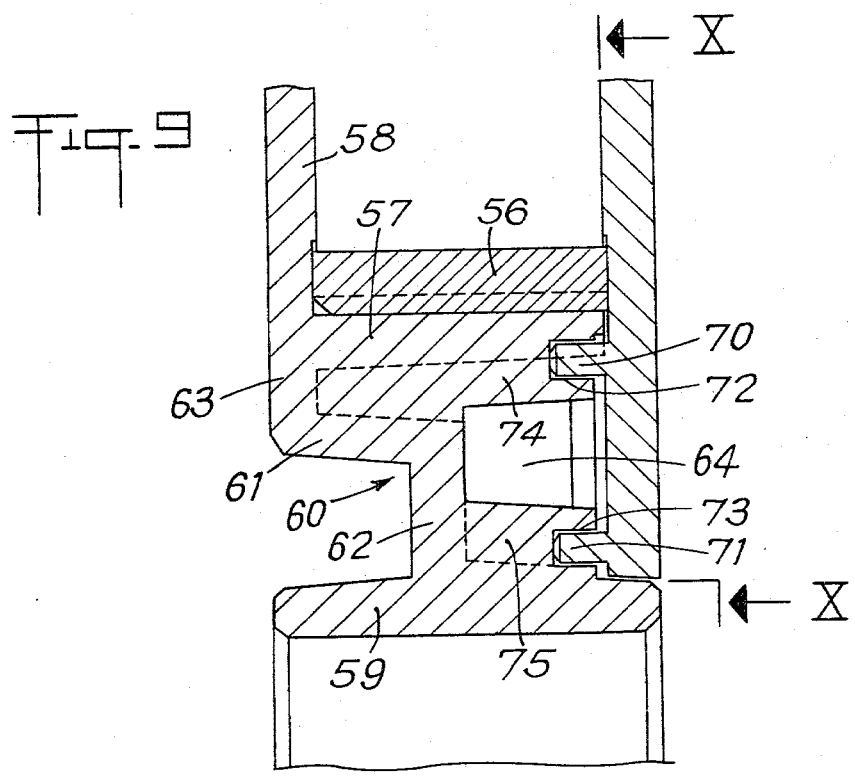
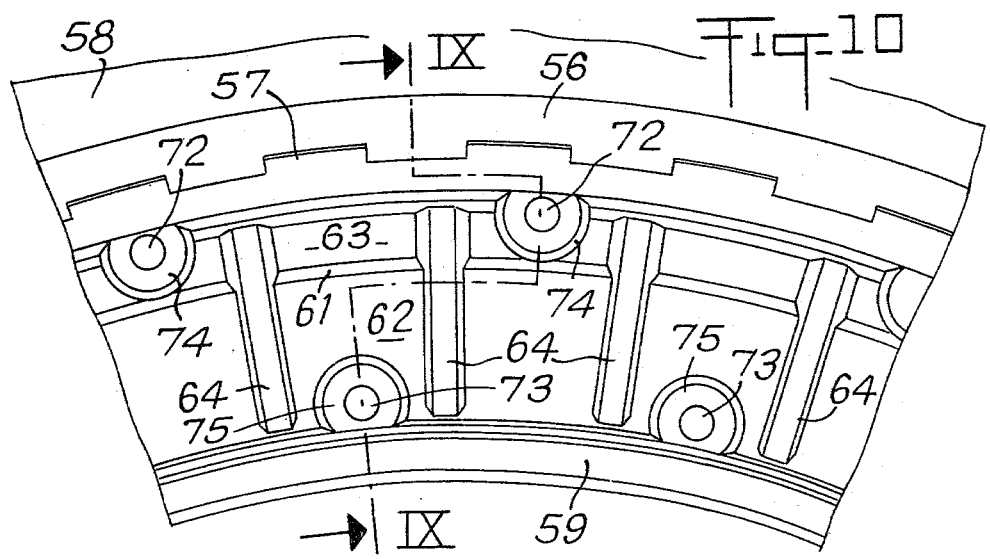

PROCESS FOR THE SIMPLIFIED PACKING OF A MAGNETIC TAPE FOR COMPUTER AND WINDING CORE FOR CARRYING OUT THIS PROCESS

The present invention relates firstly to a process for the simplified packing of a magnetic tape for computers.

To manufacture and pack magnetic tape for computers, each tape, obtained by splitting a wide film, was heretofore wound on an operational core, then this tape was rewound in a pre-constituted packing spool, taking advantage of the advance of this tape to control and certify it.

As the quality of the magnetic tapes may now be considered as perfect, the continuous control operation is no longer imposed and may be replaced by spot checks.

Consequently, it is proposed to replace the single operational core by a packing core capable, when it is filled with its magnetic tape, of being equipped with two side elements in order to constitute a conventional spool. Such a technique is known in the cine film sector, but not in that of high performance magnetic tapes for computers.

Due to the high stresses to which the magnetic tape and its spool are subjected (high speed of rotation and intense brakings), and due to the particularly dense and precise storage of data on the magnetic tape, the said packing core must be extremely strong and its shape and dimensions must be precise. However, as it must constitute part of a conventional spool, i.e. as it is highly expendable, the quantity of material used for making it must be as reduced as possible and the manufacturing technique carried out must allow an economic mass production whilst respecting the said precision.

The simplified packing process, applied to a magnetic tape for computer as defined hereinabove, is thus improved, and, according to the invention, the improvements reside:

in that, to constitute the core, the central piece of certain packing spools is used, this piece comprising a peripheral tubular ring for winding and a central drive hub, concentric with respect to each other and connected together by a web, in that the connection of the ring with the hub is strengthened by using the free space existing therebetween, over virtually the whole width of said core, in order to ensure the strength and precision of the core, and in that, when this core is filled with tape, at least one side element is added on the side of said core, effecting the connection by fixing means of which the possible participation in the strength of the core in question is not used for ensuring the winding of the magnetic tape, under good conditions.

The invention also relates to the winding core which comprises, like the central piece of certain known packing spools, a peripheral tubular winding ring and a central drive hub, concentric with respect to each other and connected together by a web and radial reinforcing ribs; the invention then resides:

in that the reinforcing means are integrated in the free space between the ring and the hub to act over the whole width of the core with a view to ensuring the strength and precision thereof;

and in that at least one side element is added to the side of this core and connected thereto by fixing means of the type which do not participate in the strength of the isolated core and do not risk damaging the magnetic tape stored on this isolated core, when the or each side element is mounted, these means being, in manner known per se, concentric annular beads, obtained by ultrasonic welding of two force fits, projecting fingers penetrating in houses of complementary shape and connected to the inner wall thereof by gluing or other non-destructive connecting means, or the like.

According to a first embodiment of the invention, in which the core is constituted by glass fibre reinforced polystyrene, the peripheral tubular ring and the central hub are fast with a flat, relatively thick bracing web located near one side, whilst a cover of stepped section located on the other side, is made fast with said ring and said hub, to form a box, by two annular beads obtained by ultrasonic welding of two force-fits; radial ribs projecting on the web then connect the ring and the hub up to near the cover, whilst other radial ribs, located between the preceding ones and projecting on the cover, extend up to near the ring, the hub and the web, these other ribs being made fast with said web by ultrasonic welding spots, all these ribs forming inner stiffeners for the box.

According to a second embodiment, in which the core is constituted by glass fibre reinforced polystyrene, the peripheral tubular ring and the central hub are fast with a relatively thick bracing web of stepped section, the peripheral area of the web being located near one side, whilst the central area connected to the preceding one by a concentric skirt extends near the median zone; according to the invention, relatively thick radial ribs project on the web and connect the ring and the hub as near as possible to the other side.

According to a third embodiment, in which the ring comprises a metal tube, the tube, made of light alloy, is internally fluted and fitted on an externally fluted glass fibre reinforced polystyrene sheath the peripheral sheath and the central hub are moulded in the same material integral with one of the side elements of the spool; this side element is provided, for connecting this sheath with this hub, with a portion of stepped section on which project radial ribs fast with said steps, the ribs being relatively thick and extending up to near the other side element to be mounted.

The invention will be more readily understood on reading the following description with reference to the accompanying drawings, in which:

FIG. 1 is a part radial section, taken along the line I—I of FIG. 2 and showing a first embodiment of the core according to the invention.

FIG. 2 is a part transverse section taken along II—II of FIG. 1.

FIG. 3 is a view similar to FIG. 1, but of which the section is broken and taken in two different radial planes extending between ribs which are themselves different depending on whether the peripheral connecting fingers or the central fingers are to be shown, this view illustrating a variant embodiment.

FIG. 4 is a part radial section along line IV—IV of FIG. 5 and showing a second embodiment of the core according to the invention.

FIG. 5 is a part side elevation taken along V—V of FIG. 4.

FIG. 6 is a view similar to FIG. 3, but of which the section is broken and taken in two different radial planes extending between ribs which are themselves different depending on whether the peripheral connecting fingers or the central fingers are to be shown, this view illustrating a variant embodiment.

FIG. 7 is a part radial section, taken along VII—VII of FIG. 8 and showing a third embodiment of the core according to the invention.

FIG. 8 is a part side elevation taken along line VIII—VIII of FIG. 7.

FIG. 9 is a view similar to FIG. 7, but taken in broken section along line IX—IX of FIG. 10 and illustrating a variant embodiment.

FIG. 10 is a part side elevation taking along line X—X of FIG. 9.

Referring now to the drawings, the core comprises:
- a peripheral tubular ring 1 around which the magnetic tape is tightly wound;
- a central hub 2 intended to be fitted and adjusted with precision, for rotation and braking thereof, on a driving spindle;
- a web 3 connecting the ring 1 to the hub 2 so that they are perfectly concentric with respect to each other.

This core is preferably constituted by glass fibre reinforced polystyrene; it is advantageously manufactured in a high precision mould in which the charged material issuing from an extruder-mixer is injected under pressure.

According to the invention, the free space between the ring and the hub is to be used to position reinforcing means perfectly integrated in the structure, with a view to ensuring the strength and rigidity of the core and, in addition, to guaranteeing perfect precision even when said core is subjected to intense stress, whether it be static (pressure of winding applied to the ring) and/or dynamic (drive or braking torque exterted on the hub).

Furthermore, two side elements 4 and 5 must be able to be added to the sides of the core, when the latter is filled with the magnetic tape, without risk of deteriorating this tape and without seeking a participation in the strength of this core.

According to a first embodiment illustrated in FIGS. 1 and 2, the bracing web 3 is relatively thick and located near one side of the core, to the right in the drawings.

A cover 6, which is also thick, is of stepped section and made fast, on the other side of the core, to the left in the drawing, with the ring 1 and the core 2. This cover is similarly constituted by glass fibre reinforced polystyrene. It presents a substantially cylindrical skirt 7 connecting two stepped shoulders 8 and 9. It is fast with radial ribs 10 spaced out equiangularly and extending in the above-mentioned free space up to near the web 3. Other radial ribs 11 are integral with the ring 1, the hub 2 and the web 3; they are located between the preceding ones 10 and reach the shoulders 8,9 of the cover, passing around skirt 7, their edge being shown in FIG. 1 by a broken line.

The connection of the cover 6 with the main part of the core is obtained by ultrasonic welding:
- of a first force fit 12 made between the cylindrical edge of the shoulder 8 and a bore of the ring 1, the diameter of this bore, before welding, being smaller than that of this edge,
- of a second force fit 13 made between the cylindrical edge of the shoulder 9 and a bore of the hub 2, the diameter of this bore, before welding, being smaller than that of this edge,
- of protuberant tongues 14 and 15, belonging to the ribs 10 of the cover, disposed near the ring 1 and hub 2 respectively and penetrating by force during welding in the web 3.

After connection of its constituent elements, the core acts like a rigid annular box having stiffeners.

When this core is filled with magnetic tape, the side elements 4 and 5 are mounted and fixed.

According to the embodiment of FIG. 1, the side element 4 is provided with two inwardly projecting annular flanges 16 and 17, connected respectively with the ring 1 and the skirt 7 of the cover by ultrasonic welding of two force-fits 18 and 19 similar to the preceding ones 12 and 13. Similarly, the side element 5 is provided with two inwardly projecting annular flanges 20 and 21, connected respectively with the ring 1 and the hub 2 by ultrasonic welding of two force fits 22 and 23 similar to the preceding ones 18 and 19.

According to the other embodiment shown in FIG. 3, the side element 4 is provided with a plurality of inwardly projecting fingers 24 and 25 penetrating in corresponding housings 26 and 27 of complementary shape made in the shoulder 8 of the cover; a connecting means which does not destroy the magnetic tape, such as a cold glue, connects the fingers with the wall of the housings. The fingers 24 and their housings 26, which are most remote from the axis of rotation of the spool, are located opposite the even spaces defined by ribs 10, 11 whilst the fingers 25 and their housings 27, which are closest to the axis of rotation of the spool, are located opposite the odd spaces defined by the ribs. Consequently, the fingers are distributed equiangularly, but in staggered arrangement on two concentric directrix circles.

Similarly, the side element 5 is provided with a plurality of inwardly projecting fingers 28 and 29 penetrating in corresponding housings 30 and 31 of complementary shape, made in bosses 32 and 33 formed on the web 3 in the vicinity of the ring 1 and the hub 2 respectively, these fingers being, as before, distributed equiangularly, but in staggered arrangement on two concentric directrix circles.

According to the second embodiment illustrated in FIGS. 4 and 5, the bracing web 3 is relatively thick and is of stepped section. It is provided with a substantially cylindrical skirt 34 connecting a lateral shoulder 35 to a median shoulder 36 respectively fast with the ring 1 and the hub 2. Radial ribs 37, which are also thick, are integral with the core and extend equiangularly, between said ring, said hub and said web, as far as the open side.

This core then acts like a box with lateral windows. When it is filled with magnetic tape, the side elements 4 and 5 are mounted and fixed.

According to the embodiment of FIG. 4, the side element 4 is provided with two inwardly projecting annular flanges 38 and 39 fixed by ultrasonic welding to the ring 1 and the skirt 34 of the web 3 respectively. A first fit 40 is force-welded by ultrasounds between the outer cylindrical edge of the flange 38 and a bore of the ring 1, the diameter of this bore, before welding, being smaller than that of this edge. A second fit 41 is force-welded by ultrasounds between the inner cylindrical edge of the flange 39 and a bore of the skirt 34, the diameter of this bore, before welding, being smaller than that of this edge.

Similarly, the side element 5 is provided with two inwardly projecting annular flanges 42 and 43, connected respectively to the ring 1 and the hub 2, by ultrasonic welding of two force fits 44 and 45 similar to the preceding ones 40 and 41.

According to the embodiment shown in FIG. 6, the side element 4 is provided with a plurality of inwardly projecting fingers 46 and 47 penetrating in corresponding housings 48 and 49 of complementary shape made in the shoulder 35 of the web 3; a connecting means not destroying the magnetic tape, such as a cold glue, connects the fingers with the wall of the housings. The fingers 46 and their housings 48, which are most remote from the axis of rotation of the spool, are located opposite the even spaces defined by the ribs 37, whilst the fingers 47 and their housings 48, which are closest to the axis of rotation of the spool, are located opposite the odd spaces defined by said ribs; consequently, the fingers are distributed equiangularly but in staggered arrangement on two concentric directrix circles.

Similarly, the side element 5 is provided with a plurality of inwardly projecting fingers 50 and 51, penetrating in corresponding housings 52 and 53 of complementary shape made in bosses 54 and 55 formed in the ring 1 and the hub 2 up to the shoulders 35 and 36 of the web. These fingers are distributed as before in equiangular manner, but in staggered arrangement on two concentric directrix circles.

According to the third embodiment illustrated in FIGS. 7 and 8, the core comprises a ring constituted by a tube 56 made of light alloy around which the magnetic tape is tightly wound. This tube is internally fluted and fitted on an externally fluted sheath 57.

The sheath 57 is integral with a side element 58 and a central hub 59. The hub is adapted to be fitted and adjusted with precision, for rotation and braking thereof, on a driving spindle. The side element 58 consititutes a bracing web 60 between this sheath 57 and this hub 59. The web is stepped and presents a skirt 61 connecting a lateral shoulder 63 extending the part of the side element 58 which guides the tape, to a substantially median shoulder 62.

This integral unit 57 to 63 is preferably made of glass fibre reinforced polystyrene; it is advantageously manufactured in a high-precision mould by injection under pressure of the charged material issuing from an extruder-mixer.

The free space between the sheath 57 and the hub 59, from the web 60 to the opposite lateral opening, is used for positioning reinforcing means perfectly integrated in the structure, with a view to ensuring the strength and rigidity of the core and, in addition, to guaranteeing perfect precision even when said core is subjected to intense stress, whether it be static (pressure of winding applied on the tube 36) and/or dynamic (drive and braking torque exerted on the hub 59).

To this end, relatively thick radial ribs 64 are integral with the unit 57 to 63 and extend equiangularly, between the sheath 57, the hub 59 and the web 60 up to the open side.

When this core is filled with magnetic tape, a second side element 65 is added and fixed.

According to the embodiment of FIG. 7, the side element 65 is provided with two internally projecting annular flanges 66 and 67 connected by ultrasonic welding with the sheath 57 and the hub 59 respectively. A first fit 68 is force-welded by ultrasounds between the outer cylindrical edge of the flange 66 and a bore of the sheath 57, the diameter of this bore, before welding, being smaller than that of this edge. A second fit 69 is force-welded by ultrasounds between the inner cylindrical edge of the flange 67 and a bore of the hub 59, the diameter of this bore, before welding, being smaller than that of this edge.

According to another embodiment shown in FIGS. 9 and 10, the side element 65 is provided with a plurality of internally projecting fingers 70 and 71 penetrating in corresponding housings 72 and 73, of complementary shape, made in bosses 74 and 75 projecting inside the sheath 57 up to shoulder 63 and, respectively, outside the hub 59 up to shoulder 62; a connecting means which does not destroy the magnetic tape, such as a cold glue, connects the fingers with the wall of the housings. The fingers 70 and their housings 72, which are most remote from the axis of rotation of the spool, are located opposite the even spaces defined by the ribs 64, whilst the fingers 71 and their housings 73 which are closest to the axis of rotation of the spool are located opposite the odd spaces defined by said ribs; consequently the fingers are distributed equiangularly, but in staggered arrangement on two concentric directrix circles.

The new process for packing a magnetic tape for computer consists in delivering large width magnetic tape under tension, in splitting this film lengthwise into a plurality of tapes having the required width, in winding each tape on a core of the type described hereinabove and, when this core is filled and dismantled, in fixing against each free side a complementary side element in order to constitute the spool for use.

The invention is not limited to the embodiments shown and described hereinabove in detail, as various modifications may be made thereto without departing from the scope thereof.

The process and the core, forming the subject matter of the invention, are applicable to the packing of magnetic tape for computer, during manufacture and use thereof.

What is claimed is:

1. Process for the simplified packing of a magnetic tape for a computer consisting in delivering large width magnetic film under tension, in splitting this film lengthwise into a plurality of tapes having the required width, in providing a plurality of cores, in winding each tape on a core and in mounting on this core when it is filled with tape at least one side element in order to constitute a packing spool, this process making it possible to eliminate the operation of rewinding the tape stored around a core in a preconstituted spool, each core comprising a peripheral tubular ring for winding and a central drive hub, concentric with respect to each other and connected together by a web, each core further comprising reinforcing means disposed in the free space existing between said ring and said hub over virtually the whole width of said core, in order to ensure the strength and precision of the core, and each core also comprising means for mounting said side element on on the side of said core.

2. A packing spool for magnetic computer tape comprising:
 at least one side element;
 a winding core comprising a peripheral tubular ring for winding, a central drive hub concentric within said ring so as to leave a free space between said ring and said hub, a web connected between said ring and said hub, and reinforcing means disposed in said free space along substantially the entire width of said core and engaging said ring and said hub to strengthen and ensure precise dimensioning of said core;

and means on said side element and said core for connecting said side element and said core.

3. In a winding core according to claim 1 or claim 2 wherein said reinforcing means comprises a cover member being in force-fitted, ultrasonically-welded engagement with said ring and said hub, said cover member being provided with housings, and wherein said means for connecting said side element and said core comprises projecting fingers on said side element for adhesive engagement within said housings.

4. The core of claim 3 wherein:
the peripheral tubular ring and the central hub are connected with a flat, relatively thick bracing web located near one side of the core;
the reinforcing means comprises a cover of stepped cross section located on the other side of the core which is connected to said ring and said hub to form a box,
radial ribs projecting from the web connect the ring and the hub up to near the cover,
and other radial ribs located between the preceding ones and projecting from the cover extend up to near the ring, the hub and the web, these other ribs being secured to the web by ultrasonic welding, all said ribs forming inner stiffeners for the box.

5. The core of claim 3 wherein the peripheral tubular ring and the central hub are connected with a relatively thick bracing wegb of stepped cross section, the peripheral area of the web being located near one side of said core, whilst the central area of the web is connected to the preceding area by a concentric skirt which extends near the median zone, and wherein relatively thick radial ribs project on the web and connect the ring and the hub as near as possible to the other side of said core.

6. The core of claim 3 wherein:
a tubular ring comprises a tube, made of light alloy, which is internally fluted and fitted on an externally fluted glass fibre reinforced polystyrene peripheral sheath,
the peripheral sheath and the central hub are moulded in the same material, integral with one of the side elements of the spool,
and this one side element is provided, for connecting this sheath and this hub, with a portion of stepped cross section on which project radial ribs are connected with said stepped portion, the ribs being relatively thick and extending up to near the other side element to be mounted.

* * * * *